Oct. 29, 1935.  I. J. FURST  2,019,128
WIRE HANDLING MACHINE
Filed March 26, 1935  3 Sheets-Sheet 1
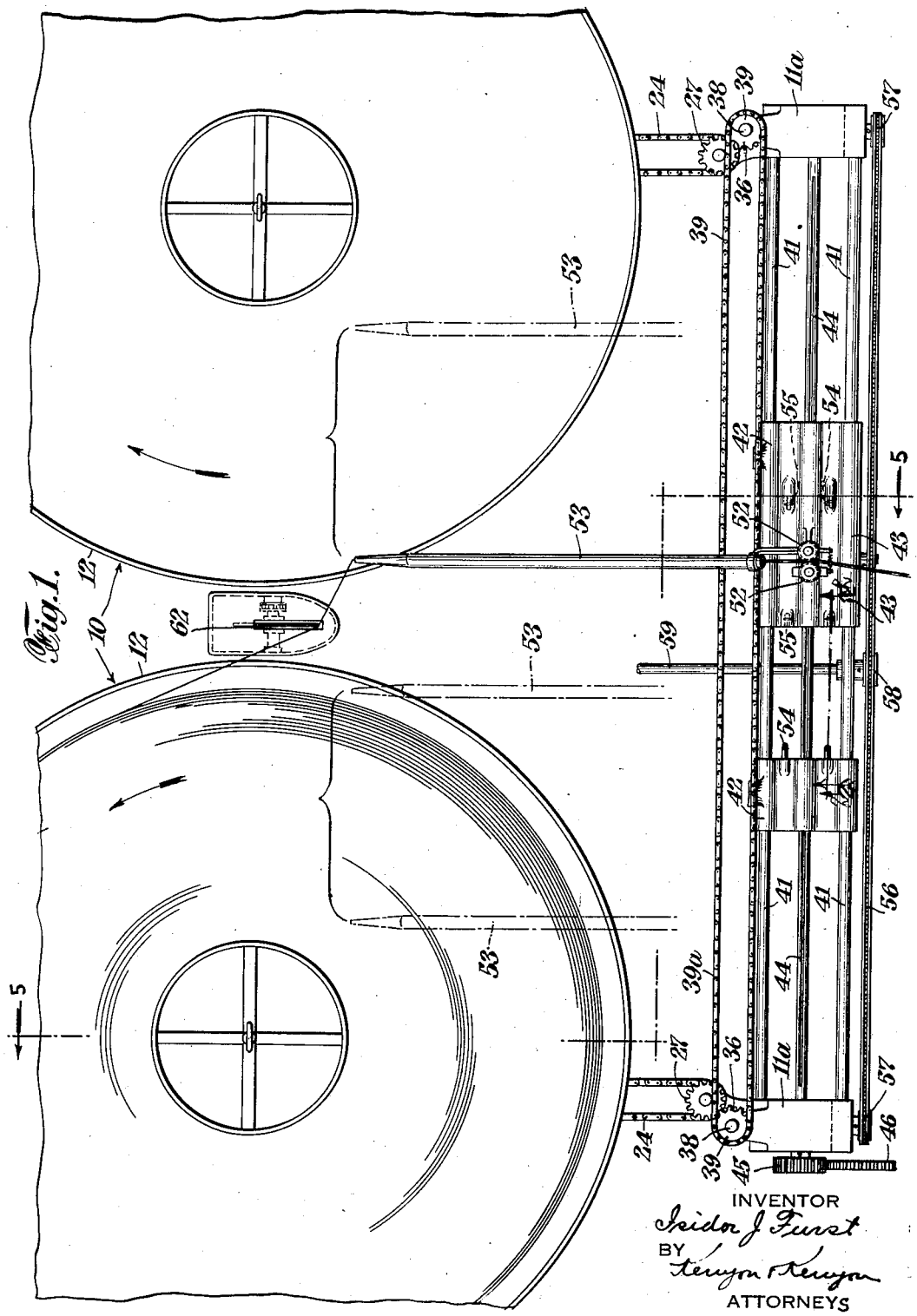
INVENTOR
Isidor J. Furst
BY
Kenyon & Kenyon
ATTORNEYS Oct. 29, 1935.  I. J. FURST  2,019,128
WIRE HANDLING MACHINE
Filed March 26, 1935     3 Sheets-Sheet 2
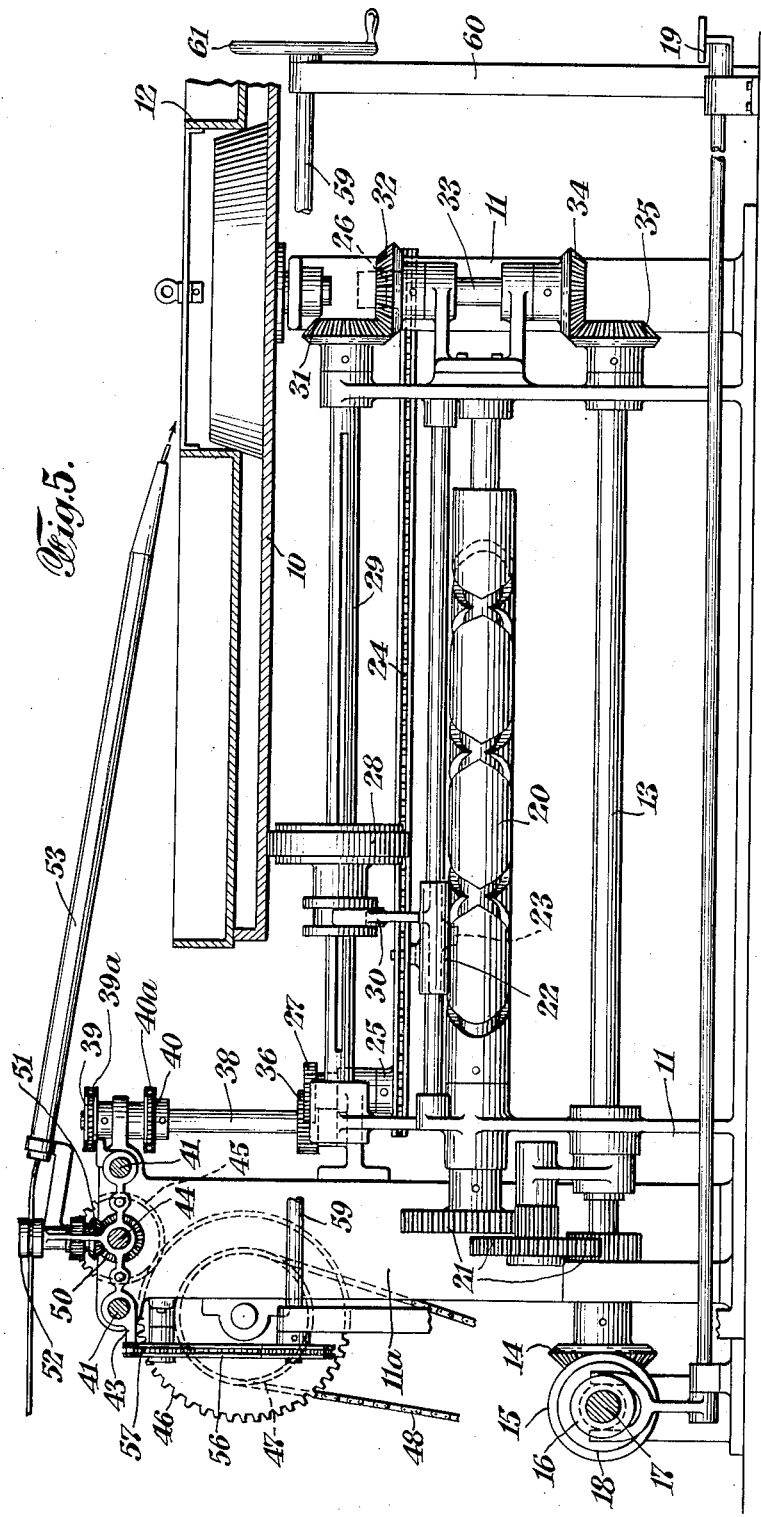
INVENTOR
Isidor J. Furst
BY Kenyon & Kenyon
ATTORNEYS

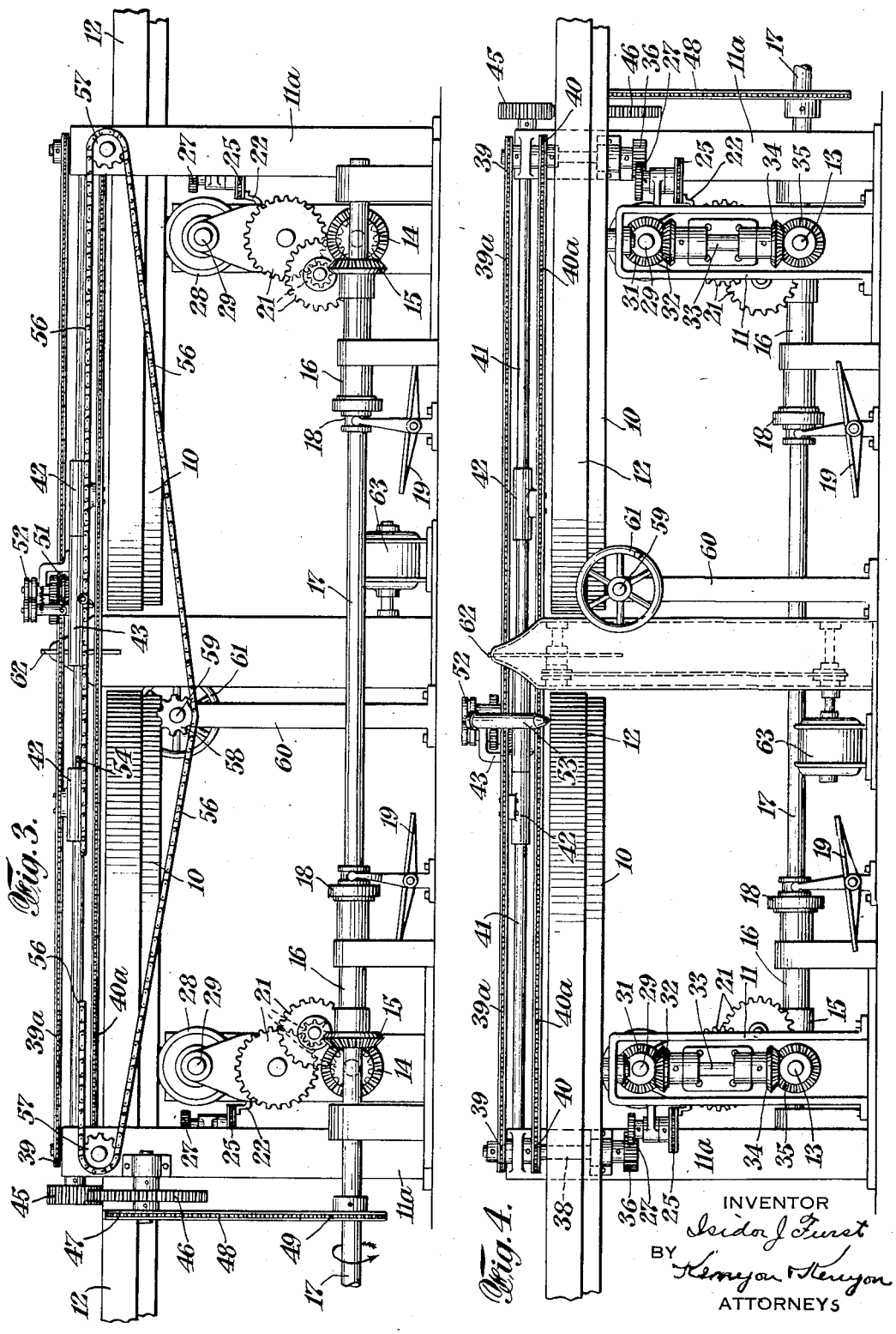

Patented Oct. 29, 1935

2,019,128

UNITED STATES PATENT OFFICE 2,019,128

WIRE-HANDLING MACHINE

Isidor J. Furst, Brooklyn, N. Y., assignor to Circle Flexible Conduit Company, Inc., Brooklyn, N. Y., a corporation of New York Application March 26, 1935, Serial No. 13,111

11 Claims. (Cl. 242—83)

This invention relates to wire-handling machines.

Heretofore, a machine has been used in connection with the manufacture of insulated wire to lay freshly insulated wire in superposed spirals, thus enabling a workman to apply powder or otherwise treat the wire. In such a machine, the wire is fed to the tray until its capacity has been reached, whereupon it is necessary to stop the machine, remove the tray and either empty the tray or substitute another. As such a machine usually receives wire direct from the insulating machine, it means that operation of the insulating machine must also be discontinued.

An object of this invention is a machine having a plurality of trays and means for transferring the feed of wire from one tray to another without interruption of the feed, thus permitting continuous operation of the machine and also continuous operation of the wire insulating machine.

Other objects, novel features and advantages of this invention will become apparent from the following specification and accompanying drawings, wherein:

Fig. 1 is a plan view of a machine embodying the invention;

Fig. 2 is a section on the line 2—2 of Fig. 1;

Fig. 3 is a rear elevation;

Fig. 4 is a front elevation, and

Fig. 5 is a section on the line 5—5 of Fig. 1.

A pair of rotatable tables 10 are supported by standards 11 and each table supports a removable tray 12. Each standard 11 has journalled therein a horizontal shaft 13, one end of which is provided with a bevel gear 14, meshing with a bevel gear 15 carried by a sleeve 16 rotatably supported by the drive shaft 17. A pair of clutches 18 are fixed to the shaft 17 and are movable into and out of clutching engagement with the sleeves 16 by actuators 19. A horizontal barrel cam 20 is journalled in each frame 11 and is driven from the shaft 13 through the medium of a gear train 21. A cam follower 22 for each cam 20 is slidably mounted on each frame 11 and is provided with a lug 23 projecting into the groove of the cam. An endless chain 24 is supported by each standard 11 through the medium of sprocket wheels 25 and 26, the former of which is mounted on a vertical shaft which also supports a gear 27. A friction wheel 28 is slidably keyed to a horizontal shaft 29 journalled in each standard 11 and engages the bottom surface of the table 10 and a yoke 30 carried by the follower 22 is received in a peripheral groove in the hub of the friction wheel 28. Each shaft 29 is provided with a bevel gear 31 which meshes with a bevel gear 32 carried by a vertical shaft 33 provided with a bevel gear 34 which meshes with a bevel gear 35 mounted on the shaft 13. Each shaft 29 is driven from the shaft 17 through intermediate gears and shafts at a constant speed and each table 10 is rotated by its wheel 28 which also rotates at a constant speed. Each wheel 28 is moved radially of its table 10 through the medium of the cam 20 and follower 22 so that the table 10 is rotated at varying speeds intermediate a maximum and minimum.

Each gear 27 meshes with a gear 36 mounted on a vertical shaft 38 on which are mounted sprockets 39 and 40, sprocket 39 being fixed to one shaft 38 and loose on the other, while the sprocket 40 is loose on the one shaft and fixed to the other. Guide rods 41 extend between the two standards 11 and on these guide rods are slidably mounted two heads or blocks 42. An endless chain 39a is trained around the sprockets 39 and an endless chain 40a is trained around the sprockets 40, the chain 39a being connected to one head 42 and the chain 40a being connected to the other head 42. Each shaft 38 is driven by a chain 24 which is moved back and forth by a follower 22. Thus, the chains 39a and 40a are caused to move back and forth and slide the heads 42 back and forth.

Also slidably mounted on the rods 41 is a carriage 43. Intermediate the guide rods is a horizontal shaft 44 which is provided at one end with a pinion 45 which meshes with a gear 46 mounted on a shaft which also supports a sprocket 47. The drive chain 48 is trained over the sprocket 47 and a sprocket 49 mounted on the shaft 17. The carriage 43 has journalled thereon a bevel gear 50 through which the shaft 44 passes and to which the shaft is slidably keyed. A bevel gear 51 meshes with the gear 50 and drives one of two friction rollers 52. A nozzle 53 is supported by the carriage in position to receive a wire or the like passing between the friction rollers and extends substantially to the center line of the two tables 10. The friction rollers 52 are driven from the shaft 17 at a constant speed by the intermediate shafts and gearing. The carriage 43 is provided at either end with a pin 54 having a peripheral groove and each head 42 is provided with a recess to receive the pin, there being a snap ring 55 in such recess. This arrangement provides means for impositively joining the carriage to either head.

An endless chain 56 is trained over sprockets 57 rotatably supported by the standards 11 and meshes with a sprocket 58 carried by a shaft 59 rotatably supported in a bracket 60, a hand wheel 61 being fixed to the shaft 59. The carriage 43 is attached to the chain 56 and by operation thereof through manipulation of the hand wheel 61 may be selectively moved into and out of connecting relation to the heads 42.

Intermediate the two tables 10 there is provided a rotating cutter 62, which is driven by a motor 63. The axis of the cutter 62 is approximately in alinement with the center line of the two tables.

In the operation of this machine, the carriage 43 is connected to one head 42 and wire or the like is supplied to the friction rollers 52 which feed the same into the nozzle 53. The nozzle 53 is moved back and forth to deliver the wire to one pan 12 which is rotated at a decreasing angular speed as the nozzle moves inwardly and at an increasing angular speed as the nozzle moves outwardly, so that the wire is distributed evenly over the tray. The change in angular speed of the tray is effected by reason of the inward and outward movement of the friction wheel 28 and the inward and outward movement of the nozzle 53 is effected from the follower 22 as previously described. The friction wheels 52 are driven at the proper speed by reason of the gear ratio between the shaft 17 and pinion 51. After a tray has been filled, the carriage 43 is disconnected from the first head 42 by operation of the hand wheel 61 in such a manner as to pull the carriage away from the head. Such movement of the carriage is continued until it engages the second head and becomes connected thereto. The nozzle 53 has thus been moved into operative relation to the second tray and during its movement has drawn the wire across the cutter 62 with the result that the same has been severed. The wire is now fed to the second tray in the same manner as above described. By operation of the proper clutch, the first table is disconnected from the drive shaft 17 and the tray with its load of wire is removed and another tray placed on the table. When the second tray is filled, the first table is again set in rotation and the feed of wire transferred back to it. The feeding of the wire through the nozzle 53 is thus maintained continuous and predetermined lengths of the wire are laid out in the pans for any desired treatment thereof and such deposition as is desirable.

I claim:

1. In combination, a carriage, a pair of reciprocating members, means to reciprocate the same, means selectively to attach said carriage to said members, a nozzle supported by said carriage, a pair of rotatable tables over each of which singly the nozzle end is arranged to travel to feed wire or the like thereto according to which reciprocating member is attached to the carriage, means for variably rotating each table according to the position of the nozzle end, and means for severing said wire or the like upon transfer of the nozzle end from feeding relation with one table to feeding relation with the other table.

2. In combination, a pair of rotatable tables, a nozzle for feeding wire or the like to said tables, means for moving one end of the nozzle toward and away from the axis of the table, means for variably rotating each table according to the position of the nozzle end relative to the table axis, means for transferring the nozzle from operative relation with one table to operative relation with the other table, and means for severing wire during the transfer.

3. In combination, a frame, a carriage slidably mounted on said frame, a pair of heads slidably supported by said frame, means for impositively attaching said carriage to either head, means for reciprocating said heads, and means for disconnecting said carriage from one head and connecting it to the other while both heads are in motion.

4. In combination, a frame, a carriage slidably mounted on said frame, a pair of heads slidably supported by said frame, means for impositively attaching said carriage to either head, means for reciprocating said heads, an endless belt supported by said frame, and means connecting said carriage to said belt.

5. In combination, a frame, a carriage slidably mounted on said frame, a pair of heads slidably supported by said frame, means for impositively attaching said carriage to either head, means for reciprocating said heads, an endless chain movably supported by said frame, a hand wheel geared to said chain, and means connecting said carriage to said chain.

6. In combination, a frame, a carriage slidably mounted on said frame, a pair of heads slidably supported by said frame, means for impositively attaching said carriage to either head, means for reciprocating said heads, an endless chain movably supported by said frame, a hand wheel geared to said chain, means connecting said carriage to said chain, a nozzle supported by said carriage, a pair of rotatable tables over each of which singly the nozzle end is arranged to travel to feed wire or the like thereto according to which head is attached to the carriage, means for variably rotating each table according to the position of the nozzle end, and means for severing said wire or the like upon transfer of the nozzle from feeding relation to one table to feeding relation to the other table.

7. In combination, a frame, a carriage slidably mounted on said frame, a pair of heads slidably supported by said frame, means for impositively attaching said carriage to either head, means for reciprocating said heads, an endless belt supported by said frame, means connecting said carriage to said belt, a nozzle supported by said carriage, a pair of rotatable tables for each of which singly the nozzle end is arranged to travel to feed wire or the like thereto according to which head is attached to the carriage, means for variably rotating each table according to the position of the nozzle end, and means for severing said wire or the like upon transfer of the nozzle from feeding relation with one table to feeding relation with the other.

8. In combination, a frame, a carriage slidably mounted on said frame, a pair of heads slidably supported by said frame, means for impositively attaching said carriage to either head, means for reciprocating said heads, an endless chain movably supported by said frame, a hand wheel geared to said chain, means connecting said carriage to said chain a nozzle supported by said carriage, a pair of rotatable tables over each of which singly the nozzle end is arranged to travel to feed wire or the like thereto according to which head is attached to the carriage, means for variably rotating each table according to the position of the nozzle end, and means for severing said wire or the like upon transfer of the nozzle from feeding relation with one table to feeding relation with the other.

9. In combination, a frame, a carriage slidably mounted on said frame, a pair of heads slidably supported by said frame, means for impositively attaching said carriage to either head, means for reciprocating said heads, means for selectively attaching said carriage to said heads, a nozzle supported by said carriage, a pair of rotatable tables over each of which singly the nozzle end is arranged to travel to feed wire or the like thereto according to which head is attached to the carriage, and means for severing said wire or the like upon transfer of the nozzle from feeding relation with one table to feeding relation with the other table.

10. In the combination according to claim 9, means for selectively attaching said carriage to said heads comprising an endless belt supported by said frame, and means connecting said carriage to said belt.

11. In the combination according to claim 9, means for selectively attaching said carriage to said heads comprising an endless chain movably supported by said frame, a hand wheel geared to said chain, and means connecting said carriage to said chain.

ISIDOR J. FURST.